(12) United States Patent
Ishihara et al.

(10) Patent No.: US 6,779,417 B2
(45) Date of Patent: Aug. 24, 2004

(54) POWER TRANSMISSION SYSTEM

(75) Inventors: Sunao Ishihara, Saitama-ken (JP); Isamu Sunaga, Saitama-ken (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 10/279,993

(22) Filed: Oct. 25, 2002

(65) Prior Publication Data
US 2003/0084738 A1 May 8, 2003

(30) Foreign Application Priority Data

Nov. 6, 2001 (JP) .................................... 2001-340938

(51) Int. Cl.$^7$ ............................ F16H 59/00; F16H 59/30
(52) U.S. Cl. ............................................ 74/335; 477/124
(58) Field of Search ........................ 74/325, 329, 335; 477/122, 123, 124; 701/64, 66

(56) References Cited

U.S. PATENT DOCUMENTS

| | | | | |
|---|---|---|---|---|
| 4,627,312 A | * | 12/1986 | Fujieda et al. .............. | 477/124 |
| 4,658,663 A | * | 4/1987 | Hiraiwa ..................... | 74/359 |
| 4,998,443 A | * | 3/1991 | Janiszewski ................ | 74/335 |
| 6,336,372 B1 | * | 1/2002 | Ogami et al. ............... | 74/335 |
| 6,389,916 B1 | * | 5/2002 | Fukuda ..................... | 74/335 |
| 2002/0014130 A1 | * | 2/2002 | Ogami et al. ............... | 74/335 |

FOREIGN PATENT DOCUMENTS

EP 0150583 A2 * 11/1984 ............... 74/335

* cited by examiner

Primary Examiner—Roger Pang
(74) Attorney, Agent, or Firm—Arent Fox PLLC

(57) ABSTRACT

A power transmission system having first to third gear pairs, each having an input gear arranged on an input shaft and an output gear arranged on an output shaft. First to third synchromeshes that may disconnect a corresponding one of the first to third gear pairs from either the input or output shaft, or perform a baulking operation for power transmission until the rotation of a corresponding one of the gear pairs and input or out shaft are synchronized, and/or connect a corresponding one of the gear pairs and either the input or output shaft by meshed engagement. When a speed position of the transmission is shifted from an M-th speed to an L-th speed, the third synchromesh moves toward the third gear pair by a predetermined amount without engaging the third gear pair so as to transmit a driving force from the input shaft to the out pout shaft.

13 Claims, 13 Drawing Sheets

F I G. 4

| | SYNCHROMESH FOR SUPPLEMENTAL TORQUE SUPPLY | | | | | |
|---|---|---|---|---|---|---|
| SPEED POSITION UP-SHIFT | 2 | 3 | 4 | 5 | 6 | 7 |
| 1 → 2 | ● | ○ | | | | |
| 2 → 3 | | ● | ○ | | | |
| 3 → 4 | | | ● | ○ | | |
| 4 → 5 | | | | ● | ○ | |
| 5 → 6 | | | | | ● | ○ |
| 6 → 7 | | | | | | ● |

F I G. 8

| | SYNCHROMESH FOR SUPPLEMENTAL TORQUE SUPPLY | | | |
|---|---|---|---|---|
| SPEED POSITION UP-SHIFT | 2 | 3 | 4 | 5 |
| 1 → 2 | ● | ○ | | |
| 2 → 3 | | ● | ○ | |
| 3 → 4 | | | ● | ○ |
| 4 → 5 | | | | ● |

POWER TRANSMISSION SYSTEM

BACKGROUND OF THE INVENTION

1. Field of the Invention

This invention relates to a power transmission system for transmitting a driving force of a prime mover to driving wheels via a stepped transmission.

2. Description of the Prior Art

Conventionally, a power transmission system of the above-mentioned kind has been proposed e.g. by Japanese Laid-Open Patent Publication (Kokai) No. 2000-65199. The power transmission system includes a five-forward-speed transmission having first to fifth speed input gears arranged on an input shaft thereof which is connected to an engine, in the mentioned order from the engine side, and first to fifth speed output gears arranged on an output shaft thereof, in constant mesh with the respective first to fifth speed input gears. These first to fifth speed input and output gears form first to fifth speed gear pairs, respectively. Further, the first and second speed output gears are rotatably supported on the output shaft, and a synchromesh is arranged on the output shaft between the two gears. The synchromesh is selectively put into meshing engagement with and disengagement from one of the first and second speed output gears, to connect and disconnect the one of the output gears to and from the output shaft, whereby the speed position of the transmission is set to the first speed position or the second speed position. Similarly, the third and fourth speed input gears are rotatably supported on the input shaft, and another synchromesh is arranged on the input shaft between the two gears. The synchromesh selectively connects and disconnects one of the third and fourth speed input gears to the input shaft, whereby the speed position of the transmission is set to the third speed position or the fourth speed position.

On the other hand, the fifth speed input gear is rotatably supported on the input gear, and connected/disconnected to and from the input shaft by a shift clutch. The shift clutch is of a hydraulic type the engagement force of which is controllable. The shift clutch is arranged on an end portion of the input shaft on a side remote from the engine, and further, a shift cylinder for controlling the shift clutch is arranged at a location outward of the shift clutch. When the speed position of the transmission is set to the fifth speed position, the hydraulic pressure of the shift cylinder is maximized, whereby the shift clutch is completely engaged. On the other hand, in conducting up-shifting operations within a shift range up to the fourth speed by using the synchromeshes, the hydraulic pressure of the shift cylinder is reduced to a smaller value to allow the shift clutch to slide, whereby part of engine torque is transmitted and supplied to the output shaft as supplemental or compensating torque. In general, in torque transmission by a synchromesh alone, the transmitted torque is reduced to zero or a value close to zero during a time period from completion of synchronization of the synchromesh to establishment of complete meshing engagement thereof. The above control operation for the shift clutch is conducted to prevent this phenomenon of "torque transmission interruption" from giving the driver a feeling of inertia travel which is peculiar to the synchromesh.

However, in the conventional power transmission system, it is necessary to arrange the hydraulic shift clutch and the shift cylinder for actuating the same on the input shaft along the same in addition to the synchromeshes so as to prevent the driver from having the inertia travel feeling during an up-shifting operation, which increases the length of the transmission in a direction along the input shaft and hence makes it impossible to make the transmission and the power transmission system including the same compact in size.

SUMMARY OF THE INVENTION

It is an object of the invention to provide a power transmission system which is capable of positively preventing a feeling of inertia travel from being caused by torque transmission interruption which might occur during a time period between completion of synchronization of a synchromesh and establishment of meshing engagement of the same in an up-shifting operation, simply by using synchromeshes alone and without increasing the axial length of a transmission.

To attain the above object, the present invention provides a power transmission system for transmitting a driving force of a prime mover to driving wheels via a stepped transmission, the stepped transmission comprising:

an input shaft connected to the prime mover;

an output shaft connected to the driving wheels;

a first gear pair for an L-th speed position, a second gear pair for an M-th speed position higher than the L-th speed position, and a third gear pair for a speed position other than and higher than the L-th speed position and the M-th speed position, each of the gear pairs having an input gear arranged on the input shaft, and an output gear arranged on the output shaft and in mesh with the input gear, with one gear of the input gear and the output gear being rotatably supported on the input shaft or the output shaft;

first to third synchromeshes for transmitting the driving force of the prime mover from the input shaft to the output shaft via the gear pairs; and synchromesh control means for controlling respective operations of the first to third synchromeshes, wherein when a speed position of the transmission is shifted from the L-th speed position to the M-th speed position, the synchromesh control means causes the third synchromesh to move toward the third gear pair by a first predetermined amount which is not large enough to bring the third synchromesh into meshing engagement with the third gear pair, to thereby transmit the driving force of the input shaft to the output shaft.

According to this power transmission system, a first gear pair for an L-th speed position, a second gear pair for an M-th speed position, and a third gear pair for a speed position other than and higher than the L-th and M-th speed positions are formed by respective input gears arranged on the input shaft connected to the prime mover and respective output gears arranged on the output shaft and in mesh with the respective input gears, and there are provided first to third synchromeshes for transmitting the driving force of the prime mover from the input shaft to the output shaft via the gear pairs. When the speed position of the transmission is shifted from the L-th speed position to the M-th speed position, the synchromesh control means causes the third synchromesh to move toward the third gear pair by a first predetermined amount which is not large enough to bring the third synchromesh into meshing engagement with the third gear pair, to thereby transmit the driving force of the input shaft to the output shaft.

As described above, in the power transmission system, in the up-shifting operation for shifting the speed position of the transmission from the L-th speed position to the M-th speed position, the third synchromesh is moved toward the third gear pair by the first predetermined amount which is not large enough to bring the third synchromesh into meshing engagement with the third gear pair, whereby during this time period, the driving force of the input shaft is transmitted via the third gear pair to the output shaft as a supplemental (i.e. compensating) driving force. As a result, the second synchromesh can be put into complete meshing engagement under the condition of the supplemental driving force being thus supplied, which makes it possible to positively prevent the transmitted driving force (torque) from being reduced to zero or a value close to zero during the up-shifting operation, thereby preventing the operation of the synchromesh from causing the feeling of inertia travel peculiar thereto. Further, since the supplemental driving force can be supplied by utilizing the third gear pair and the third synchromesh for speed positions other than the ones directly involved in the up-shifting operation from the L-th speed position to the M-th speed position, it is unnecessary to add any special component parts so as to carry out the operation for supplying the supplemental driving force. Thus, it is possible to positively prevent the driver from having the inertia travel feeling, simply by using the existing synchromeshes alone and without increasing the axial length of the transmission.

Preferably, the first to third synchromeshes are each capable of performing disconnecting operation for disconnecting the one gear of the input gear and the output gear of a corresponding one of the first to third gear pairs from the input shaft or the output shaft rotatably supporting the one gear, baulking operation by the first predetermined amount of motion thereof, for power transmission until rotations of the one gear and the input shaft or the output shaft rotatably supporting the one gear are made synchronous, and connecting operation by a second predetermined amount of motion thereof, for connecting the one gear with the input shaft or the output shaft through the meshing engagement, and each for transmitting the driving force of the prime mover from the input shaft to the output shaft via a connected one of the gear pairs including the connected one gear, and when the speed position of the transmission is shifted from the L-th speed position to the M-th speed position, the synchromesh control means causes the second synchromesh to perform the baulking operation, and causes the third synchromesh to perform the baulking operation at least during a time period after the second gear pair is made synchronous by the baulking operation of the second synchromesh and before the synchromesh control means causes the second synchromesh to start the connecting operation.

According to the preferred embodiment, each synchromesh performs the disconnecting operation, the baulking operation, and the connecting operation for a corresponding one of the first to third gear pairs. When the speed position of the transmission is shifted from the L-th speed position to the M-th speed position, the third synchromesh is caused to perform the baulking operation at least during the time period from completion of the synchronization of the second gear pair by the baulking operation of the second synchromesh and the start of the connecting operation of the same, and hence during this time period, the driving force of the prime mover is transmitted from the input shaft to the output shaft via the third gear pair to supply a supplemental (i.e. compensating) driving force. As a result, the second synchromesh is put into complete meshing engagement through its connecting operation under the condition of the supplemental driving force being thus supplied, which makes it possible to positively prevent the transmitted driving force (torque) from being reduced to zero or a value close to zero during the time period from completion of the synchronization of the second synchromesh to the complete meshing engagement of the same, thereby preventing the operation of the synchromesh from causing the feeling of inertia travel peculiar thereto.

More preferably, when the speed position of the transmission is shifted from the L-th speed position to the M-th speed position, the synchromesh control means causes, on or after starting to cause the second synchromesh to perform the baulking operation, the third synchromesh to perform the baulking operation and the first synchromesh to perform the disconnecting operation, and then after completion of the synchronization of the second gear pair by the baulking operation of the second synchromesh, causes the second synchromesh to perform the connecting operation.

According to this preferred embodiment, in shifting the speed position of the transmission from the L-th speed position to the M-th speed position, the synchromesh control means causes, on or after starting to cause the second synchromesh to perform the baulking operation, the third synchromesh to perform the baulking operation and the first synchromesh to perform the disconnecting operation, and then after termination of the baulking operation of the second synchromesh, causes the second synchromesh to perform the connecting operation. Therefore, the driving force of the prime mover can be positively supplied to the output shaft via the third gear pair over the time period from the completion of the synchronization of the second synchromesh to the start of the connecting operation of the same, which makes it possible to positively prevent the driver from having the inertia travel feeling during execution of the up-shifting operation.

Further preferably, when the speed position of the transmission is shifted from the L-th speed position to the M-th speed position, the synchromesh control means starts to cause the third synchromesh to perform the baulking operation simultaneously with starting to cause the second synchromesh to perform the baulking operation.

According to this preferred embodiment, when the speed position of the transmission is shifted from the L-th speed position to the M-th speed position, the baulking operation is performed by the third synchromesh simultaneously with the baulking operation of the second synchromesh, and hence the driving force of the prime mover is supplied to the output shaft via the third gear pair as the supplemental driving force from the start of the up-shifting operation. Therefore, torque load applied to the second synchromesh can be reduced by the amount of the torque transmitted via the third synchromesh, which makes it possible to reduce the torque capacity of the second synchromesh and suppress wear of the same.

Preferably, the first gear pair and the third gear pair are arranged adjacent to each other, and the first and third synchromeshes are formed by a unitary synchromesh arranged between the first gear pair and the third gear pair.

According to this preferred embodiment, the operation for disconnection of the first gear pair for the up-shift and the operation for supply of the supplemental driving force via the third gear pair can be carried out by using the unitary synchromesh. This reduces the number of synchromeshes to be controlled, and hence makes it possible to simplify control operations for the up-shifting operation and the supply of the supplemental driving force.

More preferably, when the speed position of the transmission is shifted from the L-th speed position to the M-th speed position, the synchromesh control means causes the third synchromesh to perform the baulking operation, then causes the first synchromesh to perform the disconnecting operation and subsequently the second synchromesh to perform the baulking operation, and further after completion of the synchronization of the second gear pair by the baulking operation of the second synchromesh, causes the second synchromesh to perform the connecting operation.

According to this preferred embodiment, in shifting the speed position of the transmission from the L-th speed position to the M-th speed position, the synchromesh control means first causes the third synchromesh to perform the baulking operation, and then causes the first synchromesh to perform the disconnecting operation and subsequently the second synchromesh to perform the baulking operation. Further, after termination of the baulking operation of the second synchromesh, causes the second synchromesh to perform the connecting operation. Therefore, in this preferred embodiment as well, the driving force of the prime mover can be positively supplied via the third gear as the supplemental driving force over a time period from the completion of the synchronization of the second synchromesh to the start of the connecting operation of the same, which makes it possible to positively prevent the driver from having the inertia travel feeling during execution of the up-shifting operation. Further, since the second synchromesh is caused to perform the baulking operation after the disconnecting operation of the first synchromesh, the first and second gear pairs arranged adjacent to each other can be connected/disconnected by using the unitary synchromesh, and hence the present invention can be applied to a conventional transmission having a plurality of gear pairs arranged in order of speed positions, without changing the layout of the gear pairs.

Preferably, the M-th speed position is one speed position higher than the L-th speed position.

The above and other objects, features, and advantages of the invention will become more apparent from the following detailed description taken in conjunction with the accompanying drawings.

BRIEF DESCRIPTION OF THE DRAWINGS

FIG. 4 is a diagram showing the relationship between each speed position up-shift, and a synchromesh and a gear pair to be used for supplemental torque supply in the FIG. 1 power transmission system;

FIG. 8 is a diagram showing the relationship between each speed position up-shift, and a synchromesh and a gear pair to be used for supplemental torque supply in the FIG. 7 power transmission system;

DETAILED DESCRIPTION OF PREFERRED EMBODIMENTS

Figure 1:
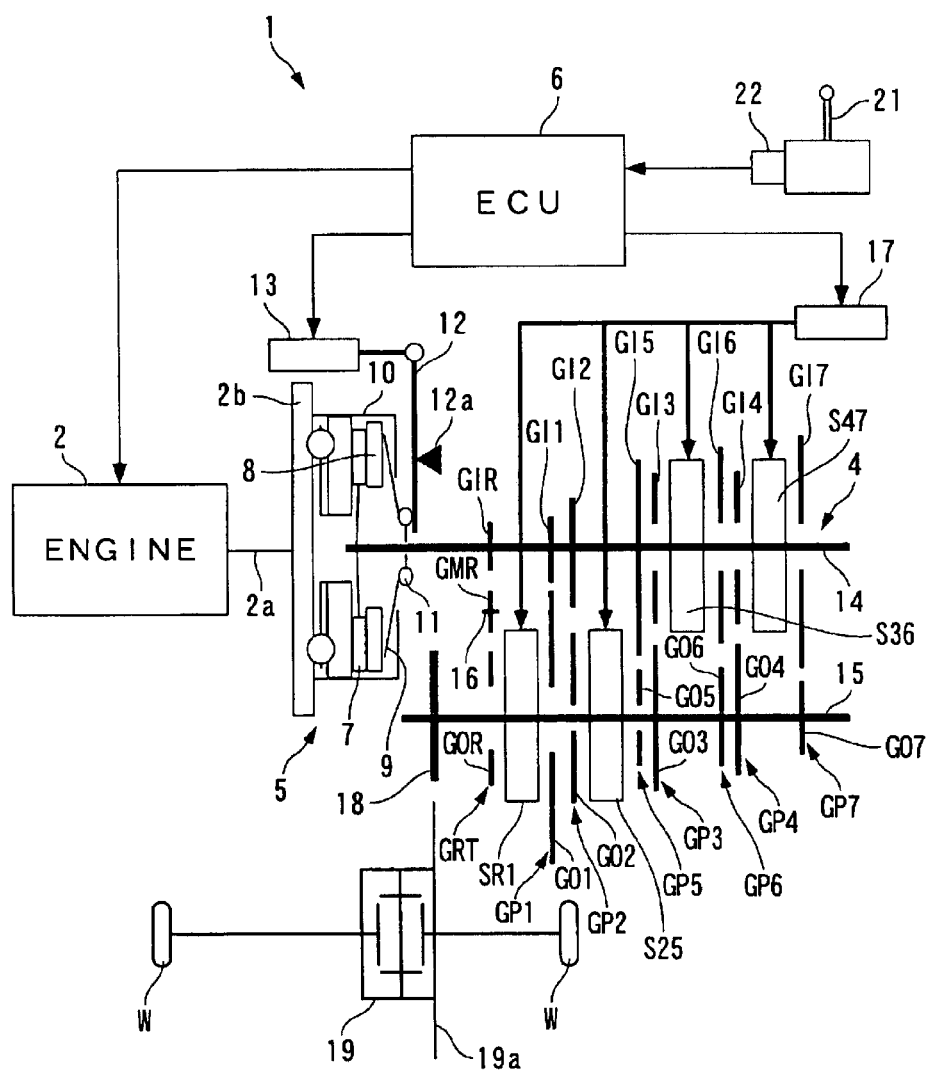
FIG. 1 is a view schematically showing the arrangement of a power transmission system to which the invention is applied and a vehicle incorporating the same.

The invention will now be described in detail with reference to the drawings showing preferred embodiments thereof. Referring first to FIG. 1, there is schematically shown the arrangement of a power transmission system to which the present invention is applied and a vehicle incorporating the same. The power transmission system 1 transmits a driving force (torque) from the engine 2 as a prime mover to driving wheels W, W while changing the rotational speed, and includes a stepped transmission 4, a starting clutch 5 for connecting/disconnecting between the engine 2 and the transmission 4, and an ECU 6 controlling operations of devices including the transmission 4 and the clutch 5.

The clutch 5 includes a friction disk 7, a pressure disk 8, and a diaphragm spring 9, which are arranged in the mentioned order between a flywheel 2b connected to a crankshaft 2a of the engine 2 and the transmission 4. The friction disk 7 is slidably supported on one end of an input shaft 14 of the transmission 4. The diaphragm spring 9 has a central portion thereof supported by a clutch cover 10 and an inner periphery thereof connected to a release bearing 11 slidably mounted on the input shaft 14. Further, the diaphragm spring 9 has an outer periphery thereof held in contact with the pressure disk 8 for urging the same toward the friction disk 7. Connected to the release bearing 11 is one end of a release fork 12 which has an intermediate portion thereof pivotally supported by a fulcrum 12a and the other end thereof connected to a starting actuator 13.

Due to the construction described above, when the starting actuator 13 is not in operation, the friction disk 7 is held in a state firmly sandwiched between the pressure disk 8 and the flywheel 2b by the urging force of the diaphragm spring 9. As a result, the input shaft 14 of the transmission 4 is connected to the crankshaft 2a of the engine 2 via the friction disk 7 and the flywheel 2b, whereby the clutch 5 is held in an engaged state. On the other hand, when the starting actuator 13 operates, the release fork 12 is pivotally moved about the fulcrum 12a in a clockwise direction, as viewed in the figure, to press the release bearing 11 against the diaphragm spring 9. As a result, the diaphragm spring 9 is resiliently deformed to move in a direction away from the pressure disk 8, so that the friction disk 7 is released from the sandwiched state, whereby the input shaft 14 of the transmission 4 and the crankshaft 2a of the engine 2 are disconnected from each other to bring the clutch 5 into a disengaged state.

The starting actuator 13 is of a hydraulic type or an electric type, and the operation thereof is controlled by a control signal from the ECU 6. The starting actuator 13 is actuated only at the start of the vehicle, whereby the clutch 5 is sequentially controlled to the engaged state, then to the disengaged state, and again to the engaged state, during the start of the vehicle. The clutch 5 is held in the engaged state at the other times.

The transmission 4 is of an automatic type in which shifting operation is controlled by the ECU 6 according to the shift position of a shift lever 21, etc. The transmission 4 includes the input shaft 14 as a main shaft, an output shaft 15 as a counter shaft, first to seventh speed gear pairs GP1 to GP7 (hereinafter generically referred to as "the gear pairs GP") for forward drive of the vehicle, a reverse gear shaft 16, and a reverse gear train GRT. The input shaft 14, the output shaft 15, and the reverse gear shaft 16 extend in parallel with each other.

The first to seventh speed gear pairs GP1 to GP7 are comprised of first to seventh speed input gears GI1 to GI7 arranged on the input shaft 14, and first to seventh speed output gears GO1 to GO7 arranged on the output shaft 15, which form pairs with the first to seventh speed input gears GI1 to GI7, and in constant mesh therewith, respectively. The gear ratios of the respective gear pairs GP1 to GP7 are set such that as a gear pair is of a higher speed position, the gear ratio thereof is smaller.

The gear pairs GP and the reverse gear train GRT are arranged from the engine side in the order of the reverse gear strain GRT the first speed gear pair GP1 the second speed gear pair GP2 the fifth speed gear pair GP5 the third speed gear pair GP3 the sixth speed gear pair GP6 the fourth speed gear pair GP4 the seventh speed gear pair GP7. In the following, description will be given following this order.

The reverse gear train GRT is comprised of a reverse input gear GIR integrally formed with the input shaft 14, a reverse intermediate gear GMR integrally formed with the reverse shaft 16, and a reverse output gear GOR rotatably fitted on the output shaft 15. Further, the first speed input gear GI1 of the first speed gear pair GP1 is integrally formed with the input shaft 14, while the first speed output gear GO1 is rotatably fitted on the output shaft 15. Between the first speed output gear GO1 and the reverse output gear GOR, there is arranged a reverse/first speed synchromesh SR1 (first synchromesh) for selectively switching the speed position of the transmission 4 to a reverse speed position and a first speed position.

This reverse/first speed synchromesh SR1 has a known construction. The construction and operation thereof will be described hereafter with reference to FIGS. 12 and 13A to 13D. It should be noted that the reverse/first speed synchromesh SR1 has its right and left halves constructed symmetrically between the first speed output gear GO1 and the reverse output gear GOR, and hence the following description will be basically given by taking the first speed output gear-side half as an example.

Figure 12:
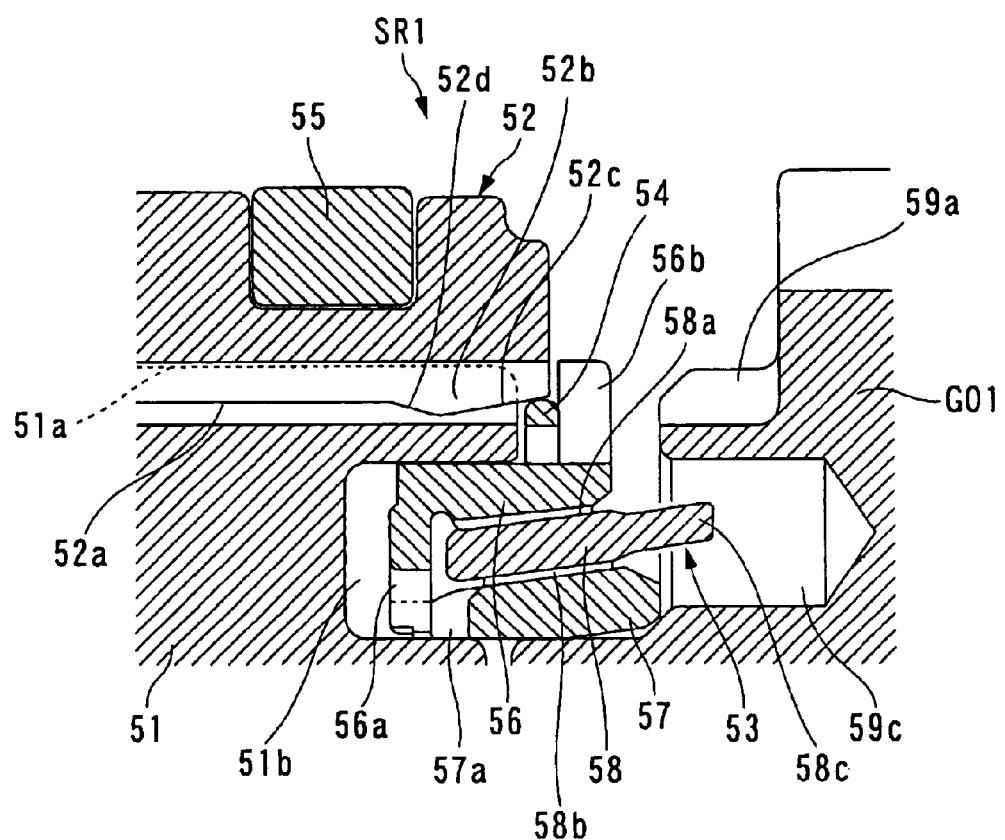
FIG. 12 is a partial cross-sectional view showing the construction of a synchromesh.
Figure 13A:
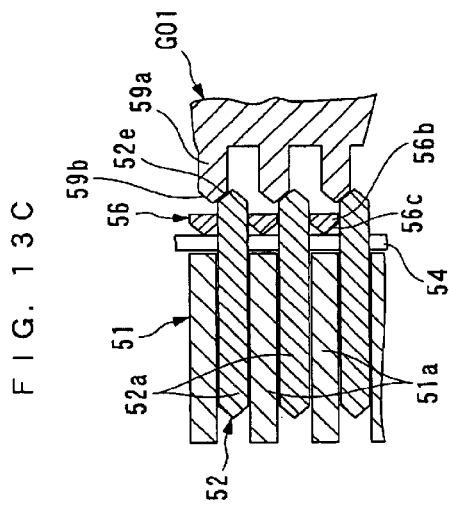
FIGS. 13A to 13D are views useful in explaining operations of the synchromesh.
Figure 13B:
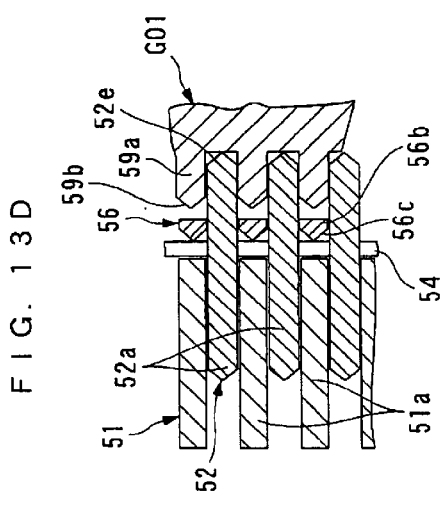
Figure 13C:
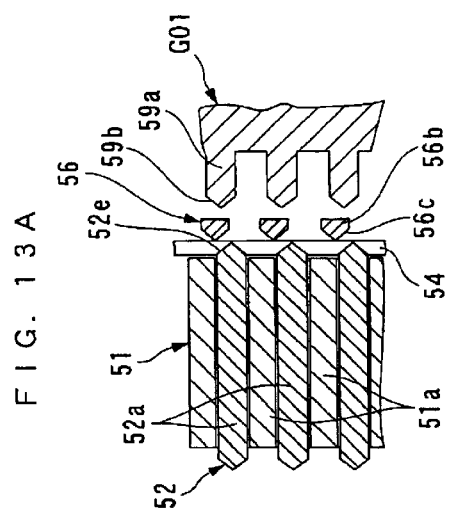
Figure 13D:
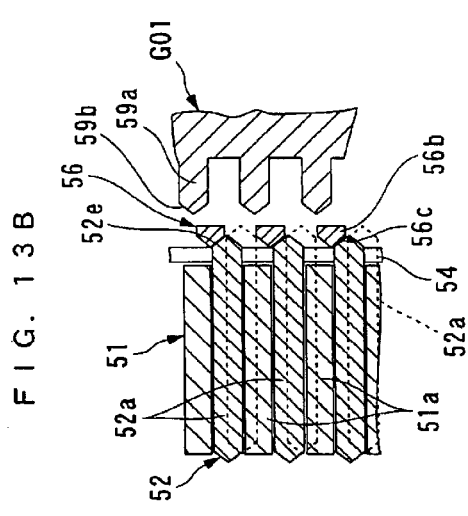

As shown in FIG. 12, the reverse/first speed synchromesh SR1 includes a hub 51 splined to the output shaft 15 and having lots of spline teeth 51a axially extending on an outer peripheral surface thereof, an annular sleeve 52 having an inner peripheral surface thereof formed with lots of spline teeth 52a, and axially slidable along the hub 51 by meshing engagement between the spline teeth 51a and 52a, a blocking ring 53 received in a recess 51b formed in an axial end face of the hub 51, and a synchro-spring 54 arranged on the outer peripheral surface of the blocking ring 53.

A shift fork 55 is fitted on the outer peripheral surface of the sleeve 52. The shift fork 55 is actuated by a shift actuator 17 (see FIG. 1) connected thereto, to actuate the sleeve 52 in the axial direction with respect to the hub 51. The spline teeth 52a as portions of the sleeve 52 are each formed with a protrusion 52b protruding radially inward from an axial end thereof. Each protrusion 52b has a radially inner surface thereof continuously formed with first and second slopes 52c, 52d in the mentioned order from the axial end face of the sleeve 52.

The blocking ring 53 is comprised of an outer ring 56 arranged at a location radially outward, an inner ring 57 arranged at a location radially inward, and a tapered cone 58 interposed between the two rings 56, 57. The outer ring 56 and the inner ring 57 are formed with locking pieces 56a, 57a, respectively, and locked to each other by engagement between the locking pieces 56a, 57a inhibiting relative rotation of the two rings 56, 57. The tapered cone 58 has outer and inner peripheral surfaces formed as tapered surfaces 58a, 58b, respectively. The inner peripheral surface of the outer ring 56 is slidably held in contact with the tapered surface 58a, while the outer peripheral surface of the inner ring 57 is slidably held in contact with the tapered surface 58b.

The outer ring 56 has an axial end portion thereof formed with lots of dog teeth 56b (see FIGS. 13A to 13D) each projecting radially outward, while the first speed output gear GO1 opposed to the dog teeth 56b also has an end portion thereof formed with lots of dog teeth 59a (see FIGS. 13A to 13D). These dog teeth 56b, 59a are formed in a manner meshable with the spline teeth 52a of the sleeve 52. Further, as shown in FIGS. 13A to 13D, the spline teeth 52a of the sleeve 52 each have an end formed with an inclined surface portion 52e, while each dog tooth 56b of the outer ring 56 and each dog tooth 59a of the first speed output gear GO1 have respective ends thereof formed with inclined surface portions 56c and 59b with which the inclined surface portion 52e can be brought into contact. The tapered cone 58 is formed with protrusions 58c protruding outward in the axial direction. The protrusions 58c are loosely fitted in respective recesses 59c formed in the first speed output gear GO1.

The synchro-spring 54 is supported by a plurality of spring supporting portions, not shown, formed at circumferentially spaced intervals on the outer peripheral surface of the outer ring 56. As shown in FIG. 12, when the sleeve 52 is in a neutral position, the synchro-spring 54 is surrounded by the dog teeth 56b of the outer ring 56, the axial end face of the hub 51, and the axial end portions of the respective spline teeth 52a of the sleeve 52.

According to the construction described above, when the sleeve 52 is in the neutral position as shown in FIG. 12, the respective protrusions 52b of its spline teeth 52a are not in contact with the synchro-spring 54, and hence the urging force of the synchro-spring 54 does not act on the outer ring 56. Consequently, the outer and inner rings 56 and 57 of the blocking ring 53 are in a state relatively rotatable with respect to the tapered cone 58 of the same. Therefore, while the outer ring 56 and the inner ring 57 rotate in unison with each other, the tapered cone 58 rotates in unison with the first speed output gear GO1, so that baulking action does not occur between the sleeve 52, hence the output shaft 15, and the first speed output gear GO1 (see FIG. 13A).

When the sleeves 52 is slid from the above position toward the first speed output gear GO1 by the shift fork 55 actuated by the shift actuator 17, the first slope 52c of the sleeve 52 urges the outer ring 56 of the blocking ring 53 via the synchro-spring 54 toward the first speed output gear GO1. Further, the inclined surface portion 52e of each spline tooth 52a of the sleeve 52 is brought into a state pressed by the inclined surface portion 56c of the corresponding dog tooth 56b of the outer ring 56 (see FIG. 13B), whereby a large frictional force is generated between the outer and inner rings 56 and 57 of the blocking ring 53 and the tapered cone 58 of the same. In this state, baulking operation is performed between the output shaft 15 and the first speed output gear GO1.

Then, when the baulking operation is completed, the difference in rotational speed between the output shaft 15 and the first speed output gear GO1 is reduced to zero, so that rotations of the output shaft 15 and the first speed output gear GO1 are made synchronous with each other, whereupon the resistance of the blocking ring 53 to the movement of the sleeve 52 is reduced or disappears. As a result, the spline teeth 52a of the sleeve 52 are each fitted between dog teeth 56b, 56b of the outer ring 56 (see broken lines in FIG. 13B). Further, each spline tooth 52a is brought into abutment on the inclined surface portion 59c of the corresponding dog tooth 59a of the first speed output gear GO1 (see FIG. 13C), and then fitted between the dog tooth 59a and an adjacent dog tooth 59a (see FIG. 13D). This causes the first speed output gear GO1 and the output shaft 15 to be completely united with each other, whereby the first speed gear pair GP1 is placed in the connected state, which establishes the first speed position of the transmission 4. It should be noted that during a time period from completion of the synchronization between the blocking ring 53 and the first speed output gear GO1 to the time point the spline teeth 52a of the sleeve 52 are each brought into abutment on the inclined surface portion 59c of the corresponding dog tooth 59a of the first speed output gear GO1 (i.e. between the state indicated by the broken lines in FIG. 13B and the state shown in FIG. 13C), a frictional force between the blocking ring 53 and the first speed output gear GO1 is reduced or disappears, and hence torque transmitted to the output shaft 15 is reduced to zero or a value close to zero.

Although not shown, when the sleeve 52 is slid toward the reverse output gear GOR, in quite the same manner as the above operation, the spline teeth 52a of the sleeve 52 are brought into engagement with the dog teeth 59a of the reverse output gear GOR after completion of synchronization between the blocking ring 53 and the reverse output gear GOR. This causes the reverse output gear GOR and the output shaft 15 to be completely united with each other, whereby the reverse gear train GRT is placed in the connected state. In this case, the transmission 4 is set to the reverse speed position due to existence of the reverse intermediate gear GMR interposed between the reverse output gear GOR and the reverse input gear GIR. Further, when the sleeve 52 is held in the neutral position, the first speed gear pair GP1 and the reverse gear train GRT are both held in the disconnected state.

It should be noted that the shift actuator 17 (synchromesh control means) for actuating the sleeve 52 is of a hydraulic or electric type, and the operation thereof is controlled by the ECU 6. Further, during the baulking operation in which the spline teeth 52a of the sleeve 52 are pressed against the respective dog teeth 56b of the blocking ring 53 for the synchronization, the pressing load can be controlled to control the amount of torque to be transmitted from the input shaft 14 to the output shaft 15 via the reverse/first speed synchromesh SR1. This pressing load is also controlled by the ECU 6 via the shift actuator 17. Other synchromeshes S25, S36 and S47, referred to hereinafter, are each similar in construction and operation to the reverse/first speed synchromesh SR1. These synchromeshes will be generically referred to as "the synchromeshes S".

The second and fifth speed gear pairs GP2 and GP5 located next to the reverse gear train GRT and the first speed gear pair GP1 have a second speed input gear GI2 and a fifth speed input gear GI5, respectively, each of which is integrally formed with the input shaft 14, and a second speed output gear GO2 and a fifth speed output gear GO5, respectively, each of which is rotatably fitted on the output shaft 15. The above-mentioned second/fifth speed synchromesh S25 (second synchromesh) similar in construction to the reverse/first speed synchromesh SR1 is arranged between the second and fifth speed output gears GO2 and GO5. Accordingly, similarly to the synchromesh SR1, the second/fifth speed synchromesh S25 selectively connects one of the second speed output gear GO2 and the fifth speed output gear GO5 to the output shaft 15 or disconnects them from the output shaft 15 simultaneously. Thus, the input shaft 14 and the output shaft 15 are connected/disconnected to and from each other via the second speed gear pair GP2 or the fifth speed gear pair GP5, whereby the transmission 4 is set to the second or fifth speed position.

On the other hand, the third and sixth speed gear pairs GP3 and GP6 located next to the gear pairs GP2 and GP5 have a third speed input gear GI3 and a sixth speed input gear GI6, respectively, each of which is rotatably fitted on the input shaft 14, and a third speed output gear GO3 and a sixth speed output gear GO6, respectively, each of which is integrally formed with the output shaft 15. The third/sixth speed synchromesh S36 (third synchromesh) similar in construction to the above speed synchromeshes SR1 and S25 is arranged between the third and sixth speed input gears GI3 and GI6. Accordingly, the third/sixth speed synchromesh S36 selectively connects one of the third speed input gear GI3 and the sixth speed input gear GI6 to the input shaft 14 or disconnects them from the same simultaneously. Thus, the input shaft 14 and the output shaft 15 are connected/disconnected to and from each other via the third speed gear pair GP3 or the sixth speed gear pair GP6, whereby the transmission 4 is set to the third or sixth speed position.

Similarly, the fourth and seventh speed gear pairs GP4 and GP7 located next to the gear pairs GP3 and GP6 have a fourth speed input gear GI4 and a seventh speed input gear GI7, respectively, each of which is rotatably fitted on the input shaft 14, and a fourth speed output gear GO4 and a seventh speed output gear GO7, respectively, each of which is integrally formed with the output shaft 15. The fourth/seventh speed synchromesh S47 is arranged between the fourth and seventh speed input gears GI4 and GI7. Accordingly, the fourth/seventh speed synchromesh S47 selectively connects one of the fourth speed input gear GI4 and the seventh speed input gear GI7 to the input shaft 14 or disconnects them from the same simultaneously. Thus, the input shaft 14 and the output shaft 15 are connected/disconnected to and from each other via the fourth speed gear pair GP4 or the seventh speed gear pair GP7, whereby the transmission 4 is set to the fourth or seventh speed position.

The output shaft 15 is integrally formed with a connection gear 18, which is in constant mesh with a gear 19a of a differential 19. Accordingly, the driving force of the engine 2 is transmitted to the output shaft 15 at a transmission gear ratio corresponding to the established speed position of the transmission 4, and then transmitted to the driving wheels W, W via the differential 19, to drive the driving wheels W, W for rotation.

The ECU 6 forms synchromesh control means, and is implemented by a microcomputer comprised of a RAM, a ROM, a CPU and an input/output interface (none of which is shown). The ECU 6 drives the starting actuator 13 and the shift actuator 17 e.g. according to the shift position of the shift lever 21, which is detected by a shift position sensor 22, to thereby control the operations of the clutch 5 and the transmission 4. Further, the ECU 6 also performs torque control of the engine 2 required for control of the transmission 4.

Figure 2:
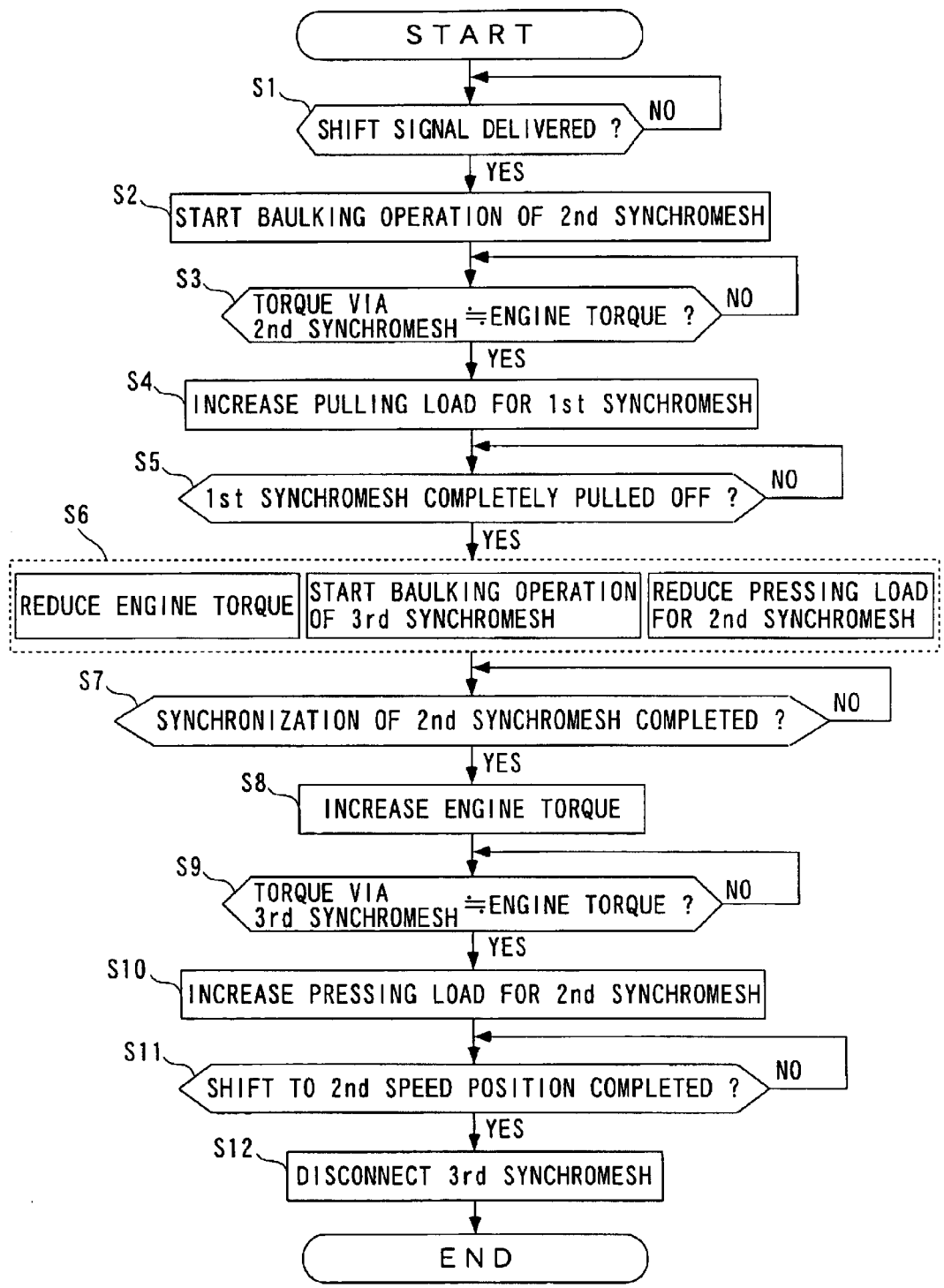
FIG. 2 is a flowchart of a supplemental torque supply process of a first embodiment of the invention, which is executed by the FIG. 1 power transmission system.
Figure 3:
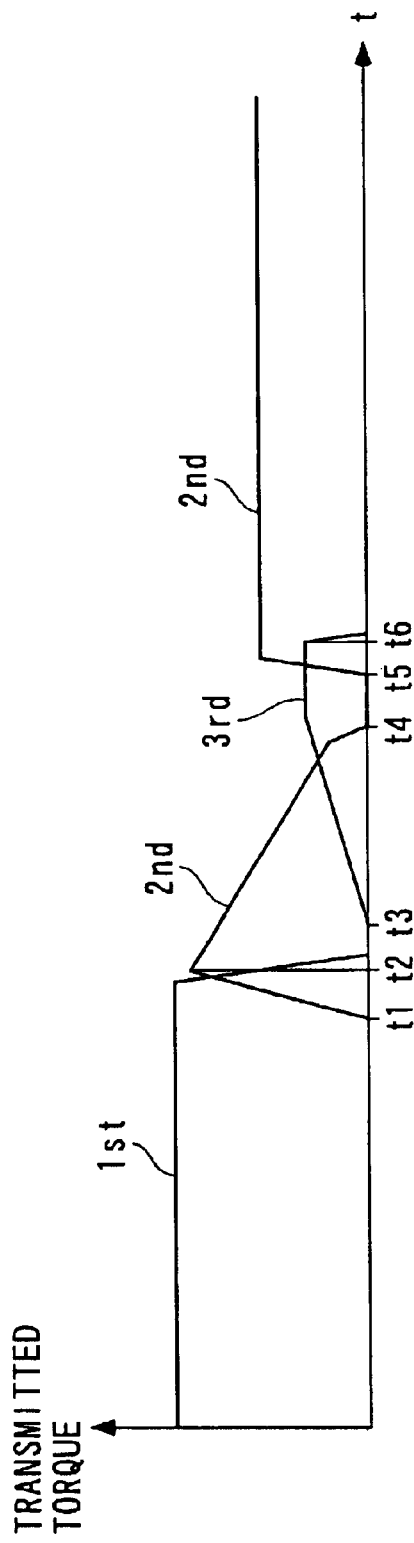
FIG. 3 is a timing chart showing an example of operations carried out according to the FIG. 2 supplemental torque supply process.

Next, a supplemental torque supply process according to a first embodiment of the invention, which is executed by the ECU 6, will be described with reference to FIGS. 2 and 3. The supplemental torque supply process is carried out so as to prevent the inertia travel feeling from being caused by torque transmission interruption occurring when a synchromesh comes into an engaged state during up-shifting of the speed position of the transmission 4. FIGS. 2 and 3 show a case of the speed position of the transmission 4 being up-shifted from the first speed position to the second speed position. First, it is determined in a step 1 (in the figures, shown as "S1", the other steps being also shown in the same manner) whether or not a shift signal has been delivered which instructs that the transmission 4 should be up-shifted from the first speed position (1st) in which the first speed gear pair GP1 is connected to the output shaft 15 by the reverse/first speed synchromesh SR1 to the second speed position (2nd).

If the answer to the question is affirmative (YES), the program proceeds to a step 2, wherein baulking operation of the second/fifth speed synchromesh S25 on the second speed gear pair GP2 is started (time t1 in FIG. 3). More specifically, the sleeve 52 of the second/fifth speed synchromesh S25 is actuated to shift toward the second speed gear pair GP2 for baulking operation. As a result, the sleeve 52 is pressed against the blocking ring 53, whereby torque (driving force) of the engine 2 is transmitted to the output shaft 15 via the second/fifth speed synchromesh S25. As the torque transmitted to the output shaft 15 via the second/fifth speed synchromesh S25 is progressively increased, torque transmitted via the reverse/first speed synchromesh SR1 is reduced by the amount of the increased torque transmission via the second/fifth speed synchromesh S25.

Then, it is determined in a step 3 whether or not the torque transmitted via the second/fifth speed synchromesh S25 has become approximately equal to the torque of the engine 2. If the answer to the question is affirmative (YES), i.e. the former has become approximately equal to the latter (time t2), pulling load applied to the sleeve 52 of the reverse/first speed synchromesh SR1 for pulling the sleeve 52 from the first speed output gear GO1 is increased in a step 4 so as to disconnect the first speed gear pair GP1 from the output shaft 15. Then, it is determined in a step 5 whether or not the sleeve 52 has been completely pulled off the first speed output gear GO1. If the sleeve 52 has been completely pulled off (time t3), the program proceeds to a step 6, wherein the torque of the engine 2 is reduced, and baulking operation of the third/sixth speed synchromesh S36 on the third speed gear pair GP3 is started while reducing pressing load applied to the blocking ring 53 by the sleeve 52 of the second/fifth speed synchromesh S25. As a result, transmission of torque via the third/sixth speed synchromesh S36 is started, and as this transmitted torque is progressively increased, the torque transmitted to the output shaft 15 via the second/fifth speed synchromesh S25 is reduced by the amount of the increased torque transmission via the third/sixth speed synchromesh S36.

Then, it is determined in a step 7 whether or not synchronization of the second/fifth speed synchromesh S25 has been completed. If the synchronization has been completed (time t4), the torque of the engine 2 is increased in a step 8. When the synchronization is completed, the torque transmitted via the second/fifth speed synchromesh S25 is reduced to zero or a value close to zero. Then, in a step 9, it is determined whether or not the torque transmitted via the third/sixth speed synchromesh S36 has become approximately equal to the torque of the engine 2. When the former has become approximately equal to the latter (time t5), the pressing load by the sleeve 52 of the second/fifth speed synchromesh S25 is increased in a step 10. As a result, the spline teeth 52a of the sleeve 52 of the second/fifth speed synchromesh S25 are each fitted between dog teeth 59a, 59a of the second speed output gear GO2, whereby the shift of the speed position of the transmission 4 to the second speed position is completed.

During the time period from the completion of the synchronization of the second/fifth speed synchromesh S25 to the meshing engagement of the same with the second speed output gear GO2, the torque transmitted via the second/fifth speed synchromesh S25 is reduced to zero or a value close to zero. However, at this time, the torque transmitted via the third/sixth speed synchromesh S36 as supplemental (or compensating) torque has been increased to a value approximately equal to the torque of the engine 2, so that the driver cannot sense torque transmission interruption. Thus, a feeling of inertia travel can be positively prevented from being given to the driver.

Then, it is determined in a step 11 whether or not the shift to the second speed position has been completed. If the shift has been completed (time t6), the sleeve 52 of the third/sixth speed synchromesh S36 is moved in a direction of being pulled off to thereby bring the synchromesh S36 into a disengaged state in a step 12, followed by terminating the program.

As described above, in the up-shifting operation from the first speed position to the second speed position, the third/sixth speed synchromesh S36 is caused to perform the baulking operation, whereby torque is transmitted and supplied as supplemental torque to the output shaft 15 via the same. This prevents momentary interruption of torque transmission during the time period from the completion of the synchronization of the second/fifth speed synchromesh S25 to the meshing engagement of the same with the second speed output gear GO2, and hence makes it possible to positively prevent the driver from having the inertia travel feeling due to the torque transmission interruption. Further, since the supplemental torque is supplied by utilizing the third/sixth speed synchromesh S36 other than the reverse/first speed synchromesh SR1 and the second/fifth speed synchromesh S25 directly involved in the present up-shifting operation, it is possible to carry out the operation of the third/sixth speed synchromesh S36 for the supplemental torque supply separately from the up-shifting operation and without interfering with the same. Further, it is not required to add any special component parts to carry out the operation for the supplemental torque supply. Thus, it is possible to positively prevent the driver from having the inertia travel feeling, simply by using the existing synchromeshes S alone and without increasing the axial length of the transmission 4.

Although in the above example, description is given of the case where supplemental torque is supplied during the up-shifting operation from the first speed position to the second speed position, similar operations for supplemental torque supply are carried out during respective up-shifting operations between other speed positions. FIG. 4 illustrates an example of the relationship between each speed position up-shift and the corresponding synchromesh S and gear pair GP driven for supplemental torque supply. This example shows that supplemental torque is supplied via a gear pair GP for a speed position one speed position higher than a speed position as a shift destination. More specifically, in up-shifting operation from the second speed position to the third speed position, supplemental torque is supplied via the fourth speed gear pair GP4 by baulking operation of the fourth/seventh speed synchromesh S47; in an up-shifting operation from the third speed position to the fourth speed position, supplemental torque is supplied via the fifth speed gear pair GP5 by baulking operation of the second/fifth speed synchromesh S25; in an up-shifting operation from the fourth speed position to the fifth speed position, supplemental torque is supplied via the sixth speed gear pair GP6 by baulking operation of the third/sixth speed synchromesh S36; and in an up-shifting operation from the fifth speed position to the sixth speed position, supplemental torque is supplied via the seventh speed gear pair GP7 by baulking operation of the fourth/seventh speed synchromesh S47. It should be noted that in the above example, supplemental torque supply in the up-shifting operation from the sixth speed position to the seventh speed position is omitted because the driver is hardly given the inertia travel feeling due to torque transmission interruption in the up-shifting operation between these high speed positions.

According to the above control method, since supplemental torque is supplied during each of the up-shifting operations except the one between the sixth speed position and the seventh speed position, it is possible to positively prevent torque transmission interruption from causing an inertia travel feeling. Further, in each case, supplemental torque is supplied by using a synchromesh other than ones directly involved in an up-shifting operation being carried out, so that it is possible to carry out the operation for supplemental torque supply without interfering with the up-shifting operation and without adding any special component parts.

Figure 5:
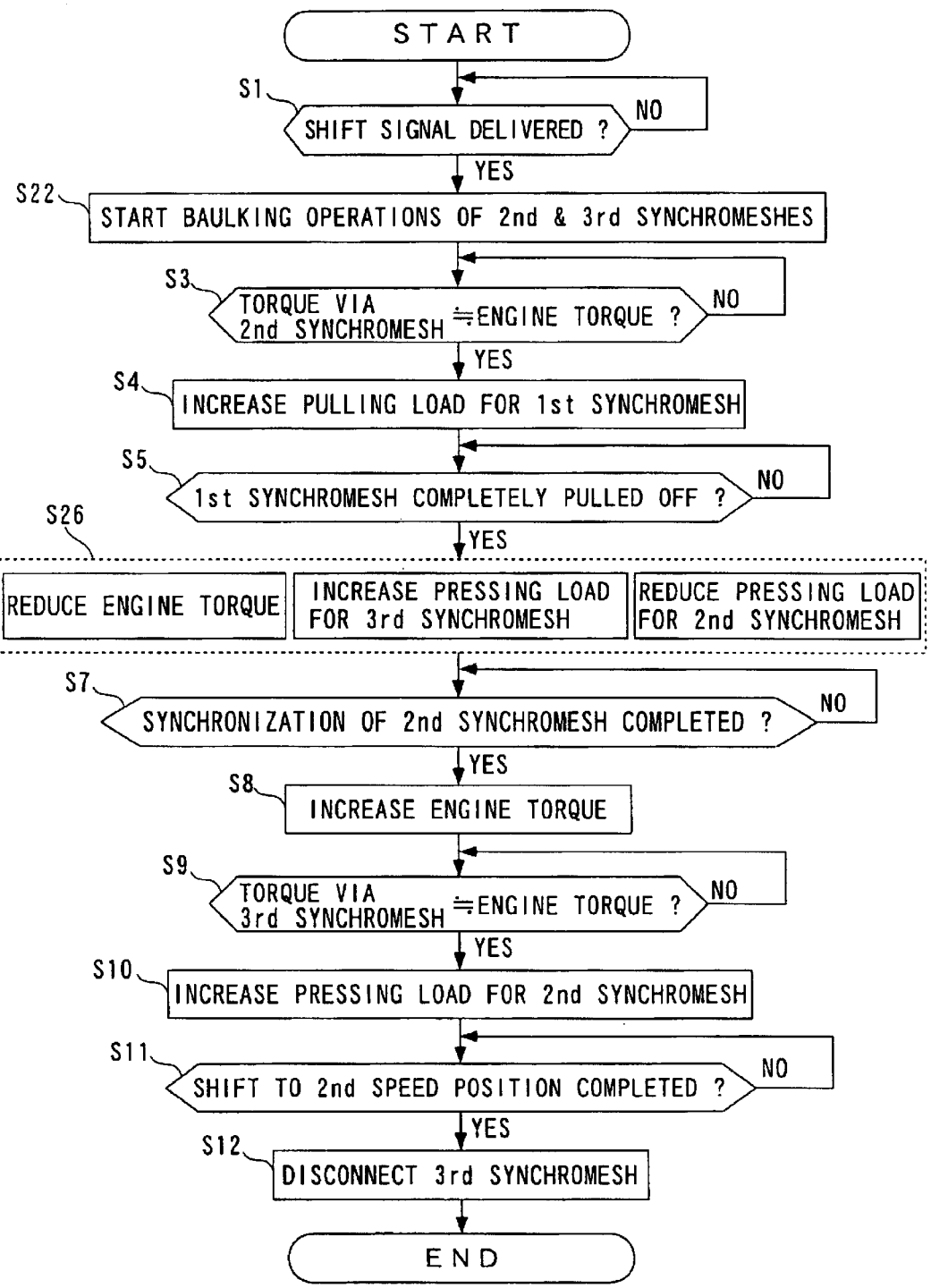
FIG. 5 is a flowchart of a supplemental torque supply process of a second embodiment of the invention.
Figure 6:
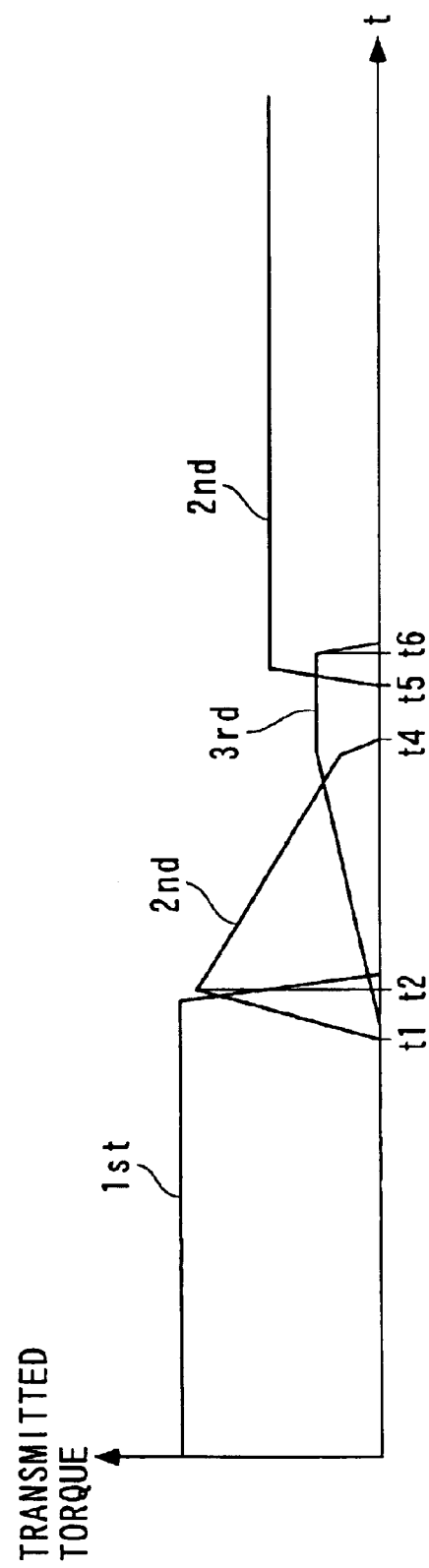
FIG. 6 is a timing chart showing an example of operations carried out according to the FIG. 5 supplemental torque supply process.

Next, a supplemental torque supply process according to a second embodiment of the invention will be described with reference to FIGS. 5 and 6 by taking an up-shifting operation from the first speed position to the second speed position as an example. It should be noted that the present supplemental torque supply process is similar to the FIG. 2 process except for a few steps, so that steps similar to those of the FIG. 2 process are designated by the same step numbers, and the following description is given mainly on different points. The present process is basically distinguished from the FIG. 2 process in that when a shift signal instructing that the speed position of the transmission should be shifted from the first speed position to the second speed position is delivered (YES to step 1), the third/sixth speed synchromesh S36 starts baulking operation thereof simultaneously with the start of baulking operation of the second/fifth speed synchromesh S25 in a step 22. Further, in the present process, when the sleeve 52 is completely pulled off the first speed output gear GO1 (YES to step 5), pressing load by the third/sixth speed synchromesh S36 is increased in a step 26.

According to the present process, in response to the shift signal, torque of the engine 2 is supplied as supplemental torque to the output shaft 15 via the third speed gear pair GP3 from the start of the up-shifting operation from the first speed position to the second speed position (from time t1 in FIG. 6), so that torque load applied to the second/fifth speed synchromesh S25 can be reduced by the amount of the supplemental torque, which makes it possible to reduce the torque capacity of the synchromesh S25 and suppress wear of the same.

Figure 7:
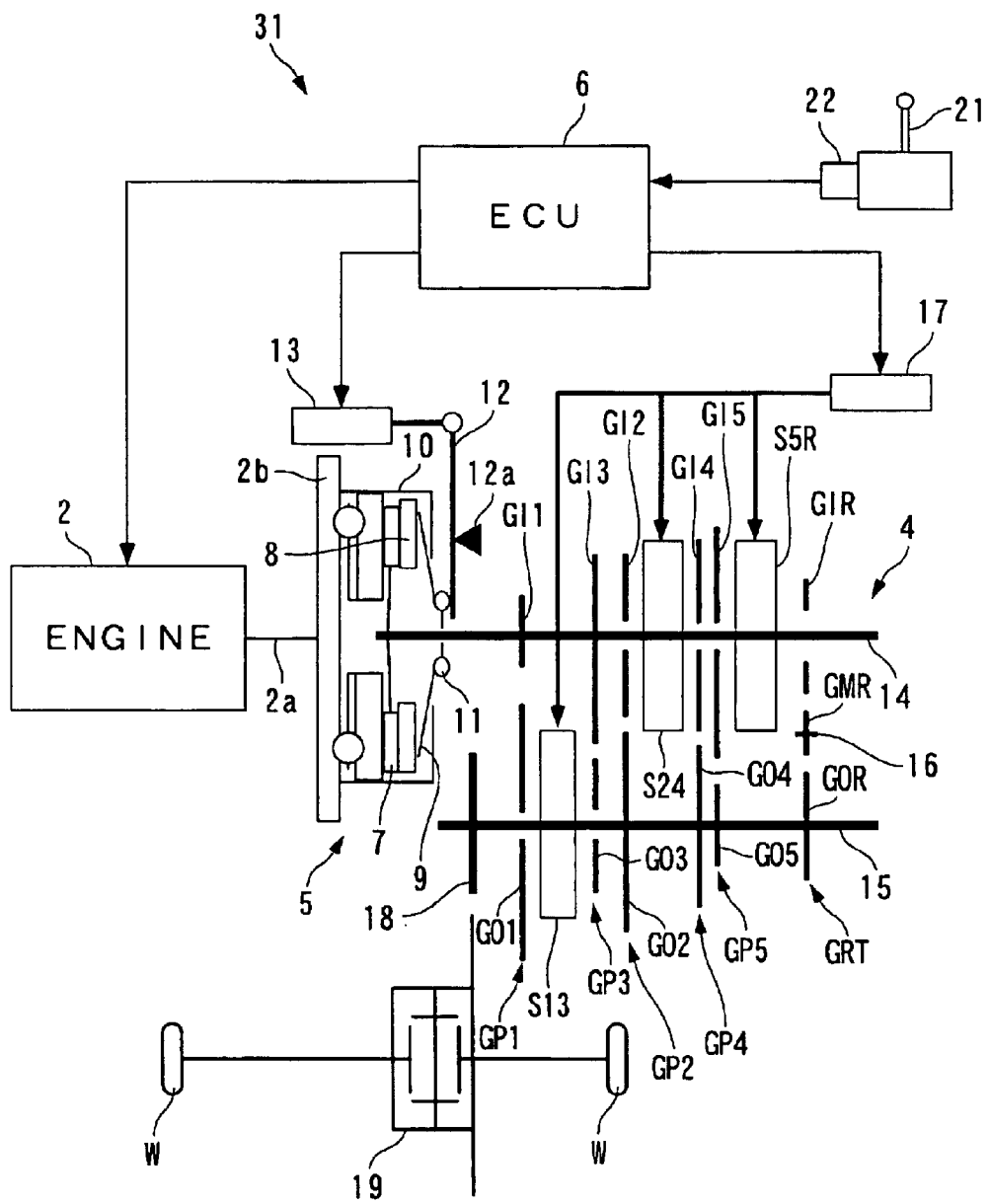
FIG. 7 is a view schematically showing the arrangement of another power transmission system to which the FIG. 2 supplemental torque supply process is applied and a vehicle incorporating the same.

FIG. 7 shows another power transmission system to which the present invention is applied. This power transmission system 31 is distinguished from the power transmission system 1 of the first embodiment by a transmission 4 having five forward speed positions and the layout or arrangement of gear pairs GP and a reverse gear train GRT on an input shaft 14 and an output shaft 15. More specifically, the power transmission system 31 has the first speed gear pair GP1, the third speed gear pair GP3, the second speed gear pair GP2, the fourth speed gear pair GP4, the fifth speed gear pair GP5, and the reverse gear train GRT arranged on the input and output shafts 14, 15 in the mentioned order from the engine side. Further, there are arranged a first/third speed synchromesh S13 between respective rotatable first and third speed output gears GO1 and GO3 of the first and third speed gear pairs GP1 and GP3, a second/fourth speed synchromesh S24 between respective rotatable second and fourth speed input gears GI2 and GI4 of the second and fourth speed gear pairs GP2 and GP4, and a fifth speed/reverse synchromesh S5R between a rotatable fifth speed input gear GI5 of the fifth speed gear pair GP5 and a rotatable reverse input gear GIR of the reverse gear train GRT.

FIG. 8 illustrates an example of the relationship between each speed position up-shift and the corresponding synchromesh S and gear pair GP driven for supplemental torque supply. Similarly to the FIG. 4 example, the present example shows that supplemental torque is supplied via a gear pair GP for a speed position one speed position higher than a speed position as a shift destination. More specifically, in an up-shifting operation from the first speed position to the second speed position, supplemental torque is supplied via the third speed gear pair GP3 by baulking operation of the first/third speed synchromesh S13; in an up-shifting operation from the second speed position to the third speed position, supplemental torque is supplied via the fourth speed gear pair GP4 by baulking operation of the second/ fourth speed synchromesh S24; and in an up-shifting operation from the third speed position to the fourth speed position, supplemental torque is supplied via the fifth speed gear pair GP5 by baulking operation of the fifth speed/ reverse synchromesh S5R. It should be noted that similarly to the first embodiment, supplemental torque supply in an up-shifting operation from the fourth speed position to the fifth speed position is omitted because the driver is hardly given the inertia travel feeling in the up-shifting operation between these highest speed positions.

Further, since the gear pairs GP and the synchromeshes S are arranged as above, e.g. in the up-shifting operation from the first speed position to the second speed position, the operation for disconnection of the first speed gear pair GP1 for the up-shift and the operation for supplemental torque supply via the third speed gear pair GP3 are carried out by using the common first/third speed synchromesh S13. Thus, the up-shifting operations and the operations for supplemental torque supply can be performed simply by operating the two synchromeshes S13, S24, which makes it possible to simplify control operation for the synchromeshes S, compared with the power transmission system 1 of the first embodiment, in which it is necessary to operate three synchromeshes S. In the present embodiment, since supplemental torque is supplied via the third speed gear pair GP3 after disconnection of the first speed gear pair GP1, the FIG. 2 process can be employed for the supplemental torque supply.

The relationship between a synchromesh S and a gear pair GP driven for supplemental torque supply in the up-shifting operation from the second speed position to the third speed position is similar to that in the up-shifting operation from the first speed position to the second speed position. More specifically, in the up-shifting operation from the second speed position to the third speed position, respective operations for disconnection of the second speed gear pair GP2 and the supplemental torque supply via the fourth speed gear pair GP4 can be carried out by using the common second/fourth speed synchromesh S24, which makes it possible to simplify control operation for the synchromeshes S.

Figure 9:
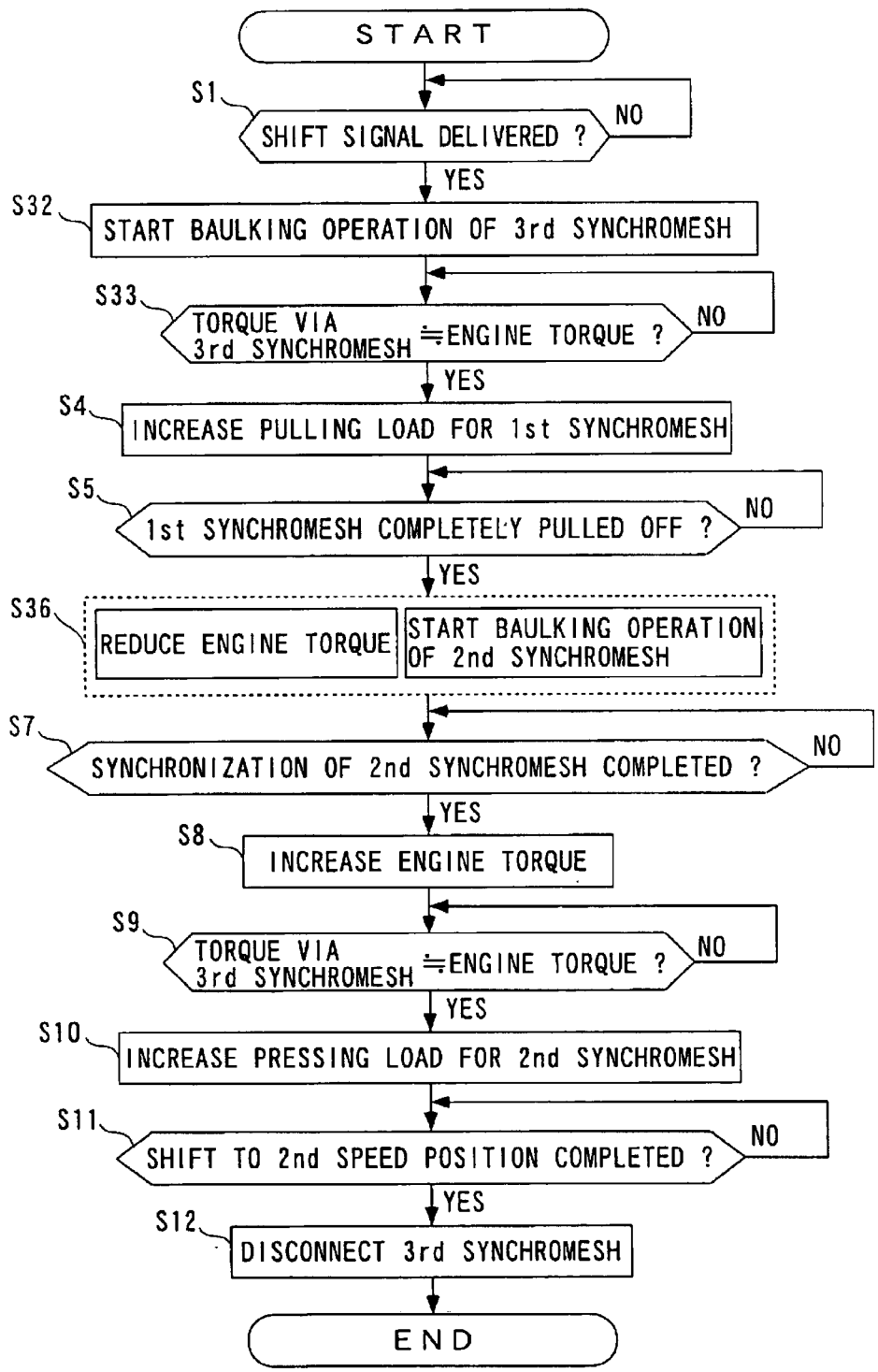
FIG. 9 is a flowchart of a supplemental torque supply process of a third embodiment of the invention.
Figure 10:
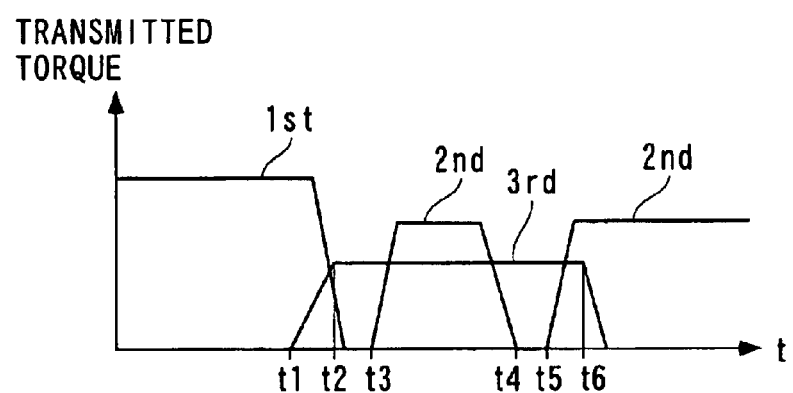
FIG. 10 is a timing chart showing an example of operations carried out according to the FIG. 9 supplemental torque supply process.

Next, a supplemental torque supply process according to a third embodiment will be described with reference to FIGS. 9 and 10 by taking an up-shifting operation from the first speed position to the second speed position as an example. It should be noted that the present supplemental torque supply process is similar to the FIG. 2 process except for a few steps, so that steps similar to those of the FIG. 2 process are designated by the same step numbers, and the following description is given mainly on different points. The present process is basically distinguished from the FIG. 2 process in that when a shift signal instructing that the speed position of the transmission should be shifted from the first speed position to the second speed position is delivered (YES to step 1), not the second/fifth speed synchromesh but the third/sixth speed synchromesh S36 is first started to be operated in a step 32, and then, only after the sleeve 52 is completely pulled off the first speed output gear GO1 (YES to step 5; time t3), the second/fifth speed synchromesh S25 is caused to start baulking operation. Accordingly, during the above process, when torque transmitted via the third/sixth speed synchromesh S36 has become approximately equal to torque of the engine 2 (YES to step 33; time t2 in FIG. 10), pulling load for pulling the sleeve 52 off the first speed output gear GO1 is increased in a step 4. Steps subsequent to the step 36 are the same as the step 7 et seq. in the FIG. 2 process.

Figure 11:
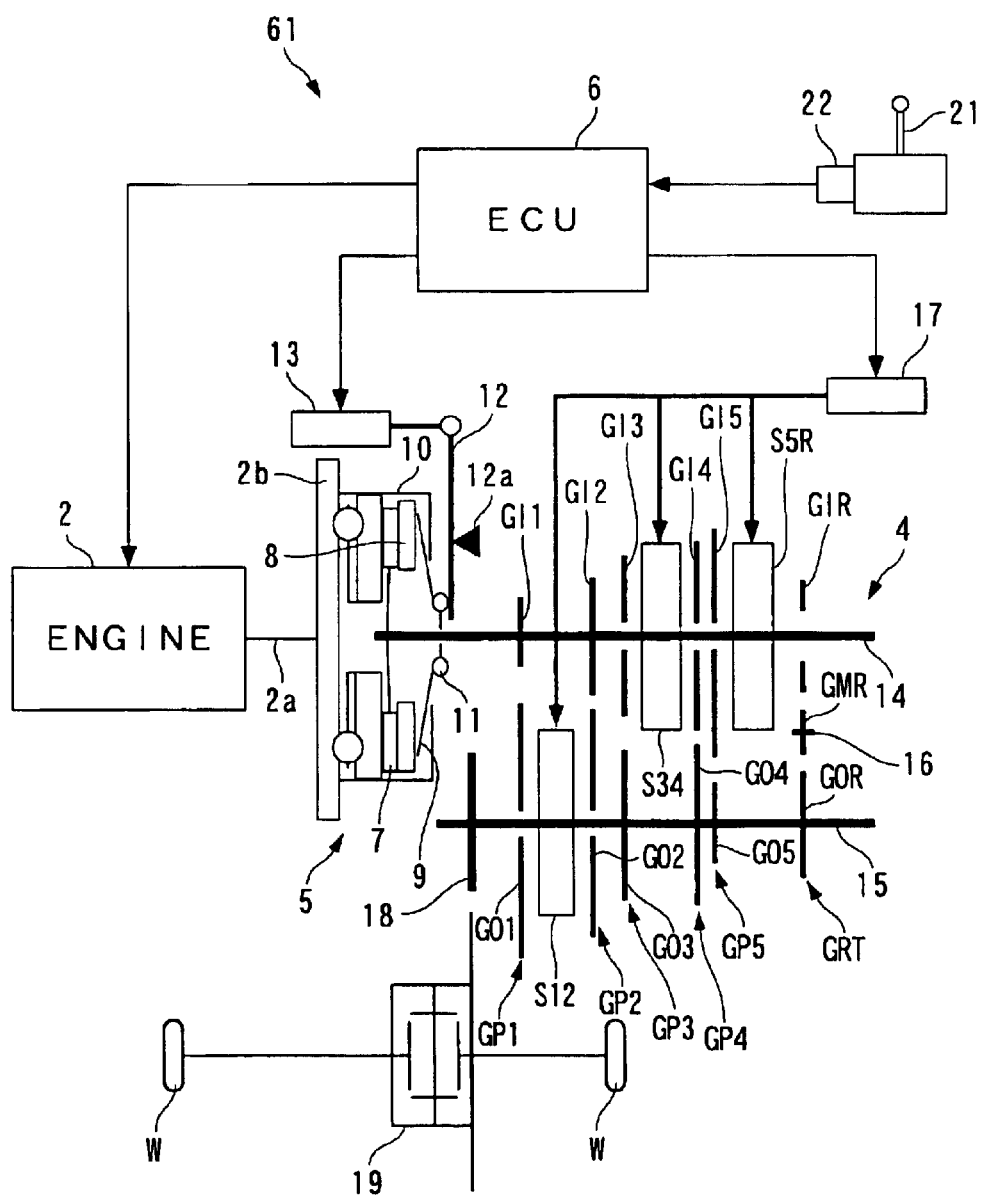
FIG. 11 is a view schematically showing the arrangement of still another power transmission system to which the FIG. 9 supplemental torque supply process is applied and a vehicle incorporating the same.

According to the present process, baulking operation of the second speed gear pair GP2 is started after completion of the operation for disconnection of the first speed gear pair GP1 as described above, it is possible to use the common synchromesh S for engagement/disengagement of the first and second speed gear pairs GP1, GP2 adjacent to each other. Therefore, the present embodiment can be applied to ordinary transmissions having a plurality of gear pairs GP arranged in order of speed positions. FIG. 11 shows a power transmission system using a transmission 4 with the ordinary layout of gear pairs GP. The power transmission system 61 has first to fifth speed gear pairs GP1 to GP5 and a reverse gear train GRT arranged in the mentioned order from the engine side. Further, there are arranged a first/second speed synchromesh S12 between the first speed and second speed gear pairs GP1 and GP3, a third/fourth speed synchromesh S34 between the third speed and fourth speed gear pairs GP3 and GP4, and a fifth speed/reverse synchromesh S5R between the fifth speed gear pair GP5 and the reverse gear train GRT. Therefore, if the supplemental torque supply process of the third embodiment is employed, the present invention can be applied to the conventional transmission 4 without changing the layout of the gear pairs.

It should be noted that the invention is not limited to the embodiments described above, but can be practiced in various forms. For instance, although in the above embodiments, supplemental torque is supplied during each of the up-shifting operations except that between the highest speed positions, this is not limitative, but since the feeling of inertia travel is conspicuous particularly in low-speed travel, supplemental torque may be supplied only in up-shifting operations between low/middle speed positions, e.g. from the first speed position to the second speed position and from the second speed position to the third speed position.

Further, although in the above embodiments, supplemental torque is supplied via a gear pair GP for a speed position one speed position higher than a speed position as a shift destination, supplemental torque may be supplied via a plurality of gear pairs GP other than the gear pair of the shift destination. For instance, if supplemental torque is supplied via the third and fourth speed gear pairs GP3, GP4 in the up-shifting operation from the first speed position to the second speed position, it is possible to further reduce torque load applied to the synchromeshes.

It is further understood by those skilled in the art that the foregoing are preferred embodiments of the invention, and that various changes and modifications may be made without departing from the spirit and scope thereof.

What is claimed is:

1. A power transmission system for transmitting a driving force of a prime mover to driving wheels via a stepped transmission, said stepped transmission comprising:

an input shaft connected to the prime mover;

an output shaft connected to the driving wheels;

a first gear pair for an L-th speed position, a second gear pair for an M-th speed position higher than the L-th speed position, and a third gear pair for a speed position other than and higher than the L-th speed position and the M-th speed position, each of said gear pairs having an input gear arranged on said input shaft, and an output gear arranged on said output shaft and in mesh with said input gear, with one gear of said input gear and said output gear being rotatably supported on said input shaft or said output shaft;

first to third synchromeshes for transmitting the driving force of the prime mover from said input shaft to said output shaft via said gear pairs; and synchromesh control means for controlling respective operations of said first to third synchromeshes, wherein when a speed position of said transmission is shifted from the L-th speed position to the M-th speed position, said synchromesh control means causes said third synchromesh to move toward said third gear pair by a first predetermined amount which is not large enough to bring said third synchromesh into meshing engagement with said third gear pair, to transmit the driving force of the input shaft to the output shaft via said third gear pair.

2. A power transmission system according to claim 1, wherein said first to third synchromeshes are each capable of performing disconnecting operation for disconnecting said one gear of said input gear and said output gear of a corresponding one of said first to third gear pairs from said input shaft or said output shaft rotatably supporting said one gear, baulking operation by the first predetermined amount of motion thereof, for power transmission until rotations of said one gear and said input shaft or said output shaft rotatably supporting said one gear are made synchronous, and connecting operation by a second predetermined amount of motion thereof, for connecting said one gear with said input shaft or said output shaft through the meshing engagement, and each for transmitting the driving force of the prime mover from said input shaft to said output shaft via a connected one of said gear pairs including said connected one gear, and wherein when the speed position of said transmission is shifted from the L-th speed position to the M-th speed position, said synchromesh control means causes said second synchromesh to perform the baulking operation, and causes said third synchromesh to perform the baulking operation at least during a time period after said second gear pair is made synchronous by the baulking operation of said second synchromesh and before said synchromesh control means causes said second synchromesh to start the connecting operation.

3. A power transmission according to claim 2, wherein when the speed position of said transmission is shifted from the L-th speed position to the M-th speed position, said synchromesh control means causes, on or after starting to cause said second synchromesh to perform the baulking operation, said third synchromesh to perform the baulking operation and said first synchromesh to perform the disconnecting operation, and then after completion of the synchronization of said second gear pair by the baulking operation of said second synchromesh, causes said second synchromesh to perform the connecting operation.

4. A power transmission system according to claim 3, wherein when the speed position of said transmission is shifted from the L-th speed position to the M-th speed position, said synchromesh control means starts to cause said third synchromesh to perform the baulking operation simultaneously with starting to cause said second synchromesh to perform the baulking operation.

5. A power transmission system according to claim 1, wherein said first gear pair and said third gear pair are arranged adjacent to each other, and said first and third synchromeshes are formed by a unitary synchromesh arranged between said first gear pair and said third gear pair.

6. A power transmission system according to claim 2, wherein said first gear pair and said third gear pair are arranged adjacent to each other, and said first and third synchromeshes are formed by a unitary synchromesh arranged between said first gear pair and said third gear pair.

7. A power transmission system according to claim 3, wherein said first gear pair and said third gear pair are arranged adjacent to each other, and said first and third synchromeshes are formed by a unitary synchromesh arranged between said first gear pair and said third gear pair.

8. A power transmission system according to claim 2, wherein when the speed position of said transmission is shifted from the L-th speed position to the M-th speed position, said synchromesh control means causes said third synchromesh to perform the baulking operation, then causes said first synchromesh to perform the disconnecting operation and subsequently the second synchromesh to perform the baulking operation, and further after completion of the synchronization of said second gear pair by the baulking operation of said second synchromesh, causes said second synchromesh to perform the connecting operation.

9. A power transmission system according to claim 1, wherein the M-th speed position is one speed position higher than the L-th speed position.

10. A power transmission system according to claim 2, wherein the M-th speed position is one speed position higher than the L-th speed position.

11. A power transmission system according to claim 3, wherein the M-th speed position is one speed position higher than the L-th speed position.

12. A power transmission system according to claim 4, wherein the M-th speed position is one speed position higher than the L-th speed position.

13. A power transmission system according to claim 8, wherein the M-th speed position is one speed position higher than the L-th speed position.

* * * * *